(12) United States Patent
Sasaki et al.

(10) Patent No.: US 6,910,034 B2
(45) Date of Patent: Jun. 21, 2005

(54) SEARCH APPARATUS, SEARCH METHOD AND STORAGE MEDIUM FOR STORING SEARCH PROGRAM

(75) Inventors: Kouichi Sasaki, Kawasaki (JP); Mika Fukui, Tokyo (JP); Toshihiro Kayama, Yokohama (JP); Hideo Umeki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 457 days.

(21) Appl. No.: 10/245,316

(22) Filed: Sep. 18, 2002

(65) Prior Publication Data

US 2003/0061210 A1 Mar. 27, 2003

(30) Foreign Application Priority Data

Sep. 26, 2001 (JP) ........................................ 2001-295113

(51) Int. Cl.⁷ .............................................. G06F 17/30
(52) U.S. Cl. ........................... 707/3; 707/100; 707/102; 707/104.1; 707/4
(58) Field of Search ...................... 707/1–3, 100–104.1; 709/206, 204; 705/9

(56) References Cited

U.S. PATENT DOCUMENTS

| | | | |
|---|---|---|---|
| 5,918,222 A | 6/1999 | Fukui et al. | |
| 5,963,951 A | * 10/1999 | Collins | 707/102 |
| 6,339,774 B1 | 1/2002 | Nakayama et al. | |
| 2002/0178225 A1 | * 11/2002 | Madenberg et al. | 709/206 |
| 2002/0194049 A1 | * 12/2002 | Boyd | 705/9 |
| 2003/0004966 A1 | * 1/2003 | Bolle et al. | 707/104.1 |

FOREIGN PATENT DOCUMENTS

| | | |
|---|---|---|
| JP | 2000-76304 | 3/2000 |
| JP | 2000-194707 | 7/2000 |
| JP | 2000-259529 | 9/2000 |
| JP | 2001-117940 | 4/2001 |

* cited by examiner

Primary Examiner—Alford Kindred
Assistant Examiner—Sana Al-Hashemi
(74) Attorney, Agent, or Firm—Oblon, Spivak, McClelland, Maier & Neustadt, P.C.

(57) ABSTRACT

There is disclosed a method of extracting a user related to a field corresponding to an inquiry content based on shared documents of a plurality of users and profile information including at least specialized fields of the plurality of users. A degree of communication of the extracted respective users with the user who has made the inquiry is calculated based on a history of communication using a network. The user who can answer the inquiry is selected from the extracted users based on the degree of communication.

28 Claims, 13 Drawing Sheets

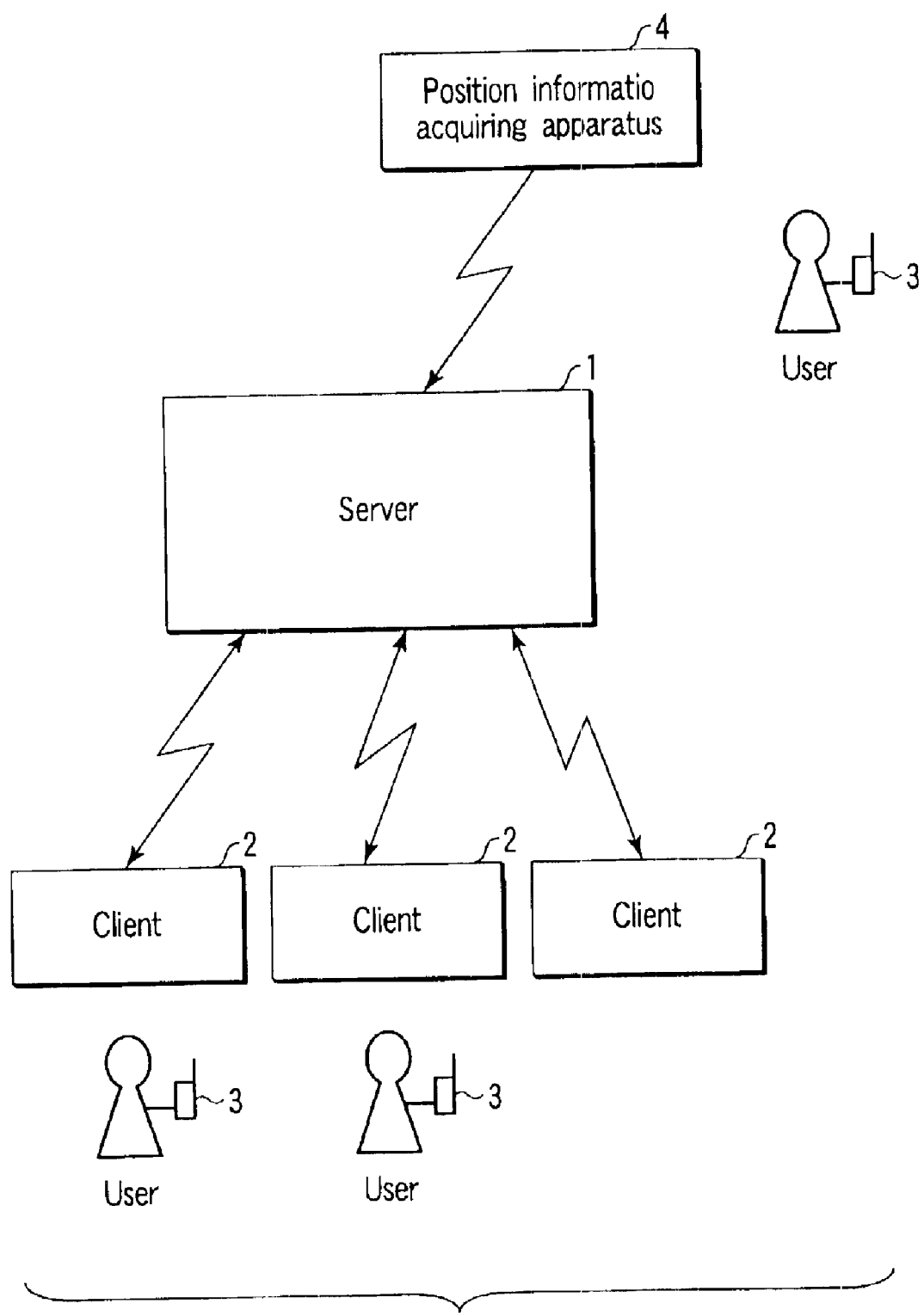
F I G. 1

Search equation

☐ Executive ☐ Same period ☐ Same department ☐ Person in charge of practice

☑ Immediate response desired ☑ Mail response desired ☐ Direct access desired

Search for person

B1 (search equation box)
B2 (Search for person button)
B3 (checkbox group)

FIG. 5

| Destination | Duplicate (cc, bcc) | Mailing list |
|---|---|---|
| +5 | +3 | +1.5 |

FIG. 8

| | Present situation of user u | | |
|---|---|---|---|
| | Seated | Out/on business trip | Temporarily off seat |
| Immediate response desired | X2 | X0.5 | X0.8 |
| Mail response desired | X1 | X1 | X1 |
| Direct access desired | X1.5 | X0.5 | X0.8 |

FIG. 9

| Parameter | Post of user u | | |
|---|---|---|---|
| | Department manager | Part manager | No responsible post |
| Preference to executive | X2 | X1.5 | X0.8 |
| Same department | X1 | X1 | X1 |
| Person in charge of practice | X0.8 | X2 | X1.5 |

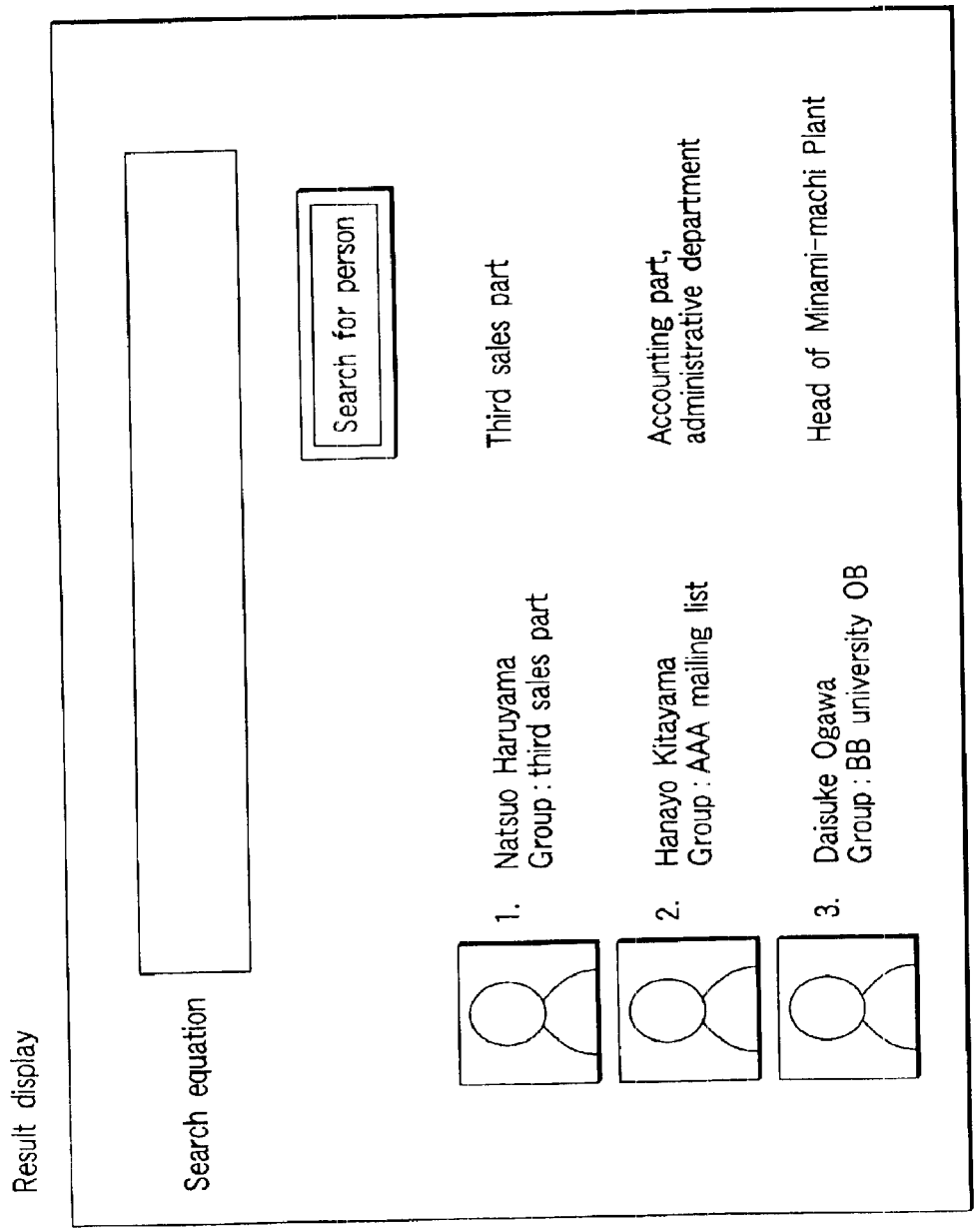
F I G. 11

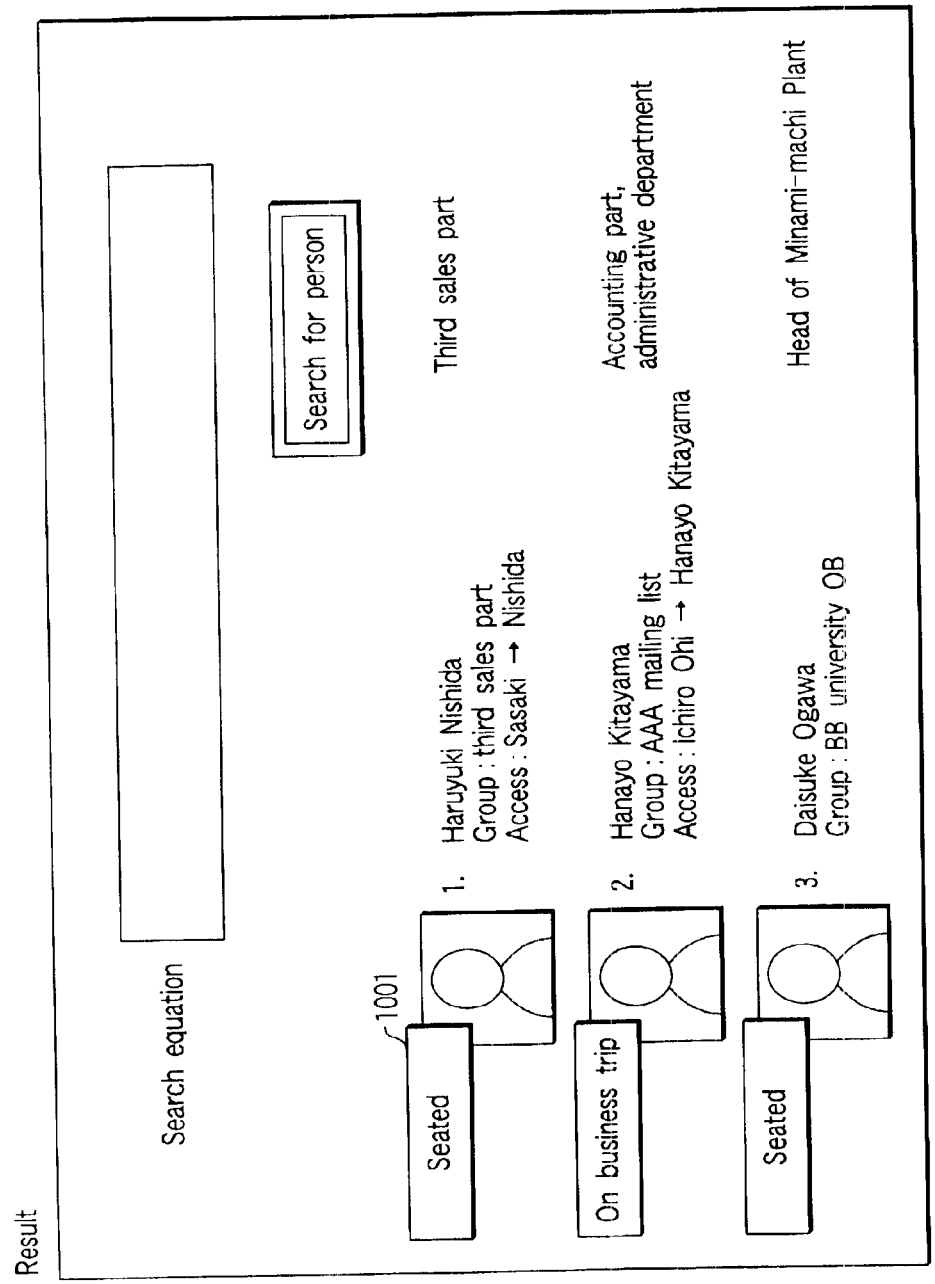
F I G. 12

| Date | Transmitter | Destination | cc | bcc |
|---|---|---|---|---|
| ○, 1 2001 12:12:01 | User a | User b | User c | |
| ○, 2 2001 12:00:00 | User b | User a | User c | |
| ○, 3 2001 13:01:01 | User a | ml.abc | | |

FIG. 13

| User name | Post | Position | Hire date | Specialized field |
|---|---|---|---|---|
| User a | Part manager | First part, development department | ○○○○, April 1 | Internet, TCP/IP |
| User b | None | Second part, development department | ○○××, April 1 | Internet, LAN |

FIG. 14

| User name | Operation situation | Location |
|---|---|---|
| User a | Used | In company |
| User b | Used | In company |
| User c | Unused | In company |
| User d | Power OFF | Office A |

SEARCH APPARATUS, SEARCH METHOD AND STORAGE MEDIUM FOR STORING SEARCH PROGRAM

CROSS-REFERENCE TO RELATED APPLICATIONS

This application is based upon and claims the benefit of priority from the prior Japanese Patent Application No. 2001-295113, filed Sep. 26, 2001, the entire contents of which are incorporated herein by reference.

BACKGROUND OF THE INVENTION

1. Field of the Invention

The present invention relates to a search apparatus, and search method of searching for a user who can answer an inquiry from another user, and a storage medium in which a search program is stored.

2. Description of the Related Art

There is a system in which a computer network is used to store a document prepared by each user in a database and the database is shared by a plurality of users. The user who uses this system sometimes desires to not only obtain the searched document but also know a user who has presented the document and useful information owned by a user engaged in a related field. However, it is difficult to describe all knowledge owned by each user in a document and store the document in a database. To solve the problem, in recent years, there has been proposed a technique of specifying the user who has presented the document, and directly communicating with the user so that useful information can be acquired.

For example, in Jpn. Pat. Appln. KOKAI Publication Nos. 2001-117940 and 2000-194707, a technique of noting each user's expertise and supporting communication among the users is described. This technique comprises: extracting information concerning a person from information stored in the database; and scoring the user with the expertise owned by the user with respect to a search request. As a result of the scoring, users presumed to be suitable for satisfying a predetermined request are presented as a list.

Moreover, in Jpn. Pat. Appln. KOKAI Publication Nos. 2000-76304 and 2000-259529, a technique of noting a user's personal connection is disclosed. In this technique, the personal connection is extracted from a communication history among the users on the network. When communicable users are mediated based on the personal connection, the communication among the users is supported.

However, these conventional search techniques only comprises: searching for the user based on the stored information such as a user's specialized field and a degree of interaction with a person who requires the search by the communication. Therefore, the user is not searched from a time viewpoint that a user capable of quickly answering another user's inquiry is searched.

More concretely, in the technique of scoring the user having a considerable expertise with respect to a certain search request, it is difficult to judge "the user from whom a response can quickly be obtained upon inquiring". Moreover, the list of users extracted only from static information such as stored data and past communication history is not sometimes useful, for example, in a case in which a user familiar with certain information has to be quickly contacted.

Moreover, in the conventional search technique, an appropriate user cannot be searched and presented in some cases.

That is, in the technique of scoring the user having the considerable expertise with respect to the certain search request, it is difficult for the person who has required the search to judge which user having given substantially the same score is suited. Moreover, in the technique of extracting the personal connection from the past communication history, a distance in the personal connection is determined in accordance with a frequency of the past communication. Therefore, a user who has not directly communicated is placed in a far position in the personal connection. Therefore, there is a possibility that the user having the considerable expertise is not presented as an object of inquiry.

BRIEF SUMMARY OF THE INVENTION

The present invention has been developed in consideration of the above-described problems, and an object thereof is to provide a search method and apparatus in which it is possible to search for a user capable of securely answering an inquiry.

The present invention may provide a search apparatus which searches for a first user capable of answering an inquiry from a second user from users of a plurality of terminal apparatuses connected to a network, the apparatus comprising: a receiving unit configured to receive the inquiry and a search condition; a memory which stores shared documents prepared by the users of the plurality of terminal apparatuses respectively and profile information of the users; a search unit configured to search a shared document related to the inquiry and one of the profile information which matches the search condition from the memory and to extract a third user who have prepared the searched shared document and a fourth user corresponding to the searched profile information from the users of the plurality of terminal apparatuses; a calculator which calculates a degree of communication between the third and fourth users and the user who has made the inquiry based on a history of communication using the network; a selection unit configured to select a user who can answer the inquiry as the first user from the third and fourth users based on the degree of communication with the second user; and a presentation unit configured to present the first user to second the user.

The present invention may provide a search apparatus which searches for a first user capable of answering an inquiry from a second user from users of a plurality of terminal apparatuses connected to a network, the apparatus comprising: a receiving unit configured to receive the inquiry and a search condition; a memory which stores shared documents prepared by the users of the plurality of terminal apparatuses respectively and profile information of the respective users; a search unit configured to search a shared document related to the inquiry and one of the profile information which matches the search condition from the memory and to extract a third user who has prepared the searched shared document and a fourth user corresponding to the searched profile information; an estimation unit configured to estimate present situations of the third and fourth users; a calculator which calculates an index indicating a quickness for the answer to the inquiry for each of the third and fourth users based on the estimation; a selection unit configured to select a user who can answer the inquiry as the first use from the third and fourth users based on the index; and a presentation unit configured to present the first user to the second user.

The present invention may provide a search method of searching for a first user who can answer an inquiry from a second user from users of a plurality of terminal apparatuses connected to a network, the method comprising: receiving the inquiry and a search condition; searching shared documents, which are prepared by the users of the plurality of terminal apparatuses respectively and concern the inquiry, and profile information of the users for the shared documents related to the inquiry and the profile information which matches the search condition; extracting a third user who has prepared a searched shared document and a fourth user corresponding to the searched profile information; calculating a degree of communication between the third and fourth users and the second user based on a history of communication using the network; selecting a user who can answer the inquiry from the respective extracted users as the first user based on the degree of communication with the second user; and presenting the first user to the second user.

The present invention may provide a search method of searching for a first user who can answer an inquiry from a second user from users of a plurality of terminal apparatuses connected to a network, the method comprising: receiving the inquiry and a search condition; searching shared documents, which are prepared by the users of the plurality of terminal apparatuses respectively and concern the inquiry, and profile information of the users for the shared document related to the inquiry and the profile information which matches the search condition; extracting a third user who has prepared the searched shared document and a fourth user corresponding to the searched profile information; estimating present situations of the third and fourth users; calculating an index indicating a quickness for the answer to the inquiry for each of the third and fourth users based on the estimation; selecting a user who can answer the inquiry from the extracted users as the first user based on the index; and presenting the first user to the second user who has made the inquiry.

The present invention may provide a search method of using a network to search for a first user who can answer an inquiry from a second user, the method comprising: receiving the inquiry and search condition; selecting a user who can answer the inquiry from a plurality of users of a plurality of terminal apparatuses as the first user based on expertise of each of the users and present situations of each of the users; and presenting the first user to the second user.

The present invention may provide a search method of using a network to search for a first user who can answer an inquiry from a second user, the method comprising: receiving the inquiry and search condition; calculating a degree of communication between the second and a plurality of users of a plurality of terminal apparatuses connected to the network based on a history of communication using the network; selecting a user who can answer the inquiry from a plurality of users of the plurality of terminal apparatuses as the first user based on expertise of each of the users and the degree of communication; and presenting the first user to the second user.

The present invention may provide a computer-readable memory storing a search program utilizing a plurality of terminal apparatuses connected to a network, the program comprising: means for causing a computer to receive an inquiry from a second user and a search condition; means for causing a computer to store shared documents prepared by the users of the plurality of terminal apparatuses respectively and profile information of each of the users; means for causing a computer to search the shared documents related to the inquiry and the profile information which matches the search condition and to extract a third user who has prepared the searched shared document and a fourth user corresponding to the searched profile information; means for causing a computer to calculate a degree of communication between the third and fourth users and the second user based on a history of communication using the network; means for causing a computer to select a first user who can answer the inquiry from the third and fourth users based on the degree of communication with the second user; and means for causing a computer to present the first user to the second user.

The present invention may provide a computer-readable memory storing a search program utilizing a plurality of terminal apparatuses connected to a network, the program comprising: means for causing a computer to receive an inquiry from a second user and a search condition; means for causing a computer to search a shared document related to the inquiry and profile information of each of the users which matches the search condition and to extract a third user who has prepared the searched shared document and a fourth user corresponding to the searched profile information; means for causing a computer to estimate present situations of the third and forth respective users; means for causing a computer to calculate an index indicating a quickness for the answer to the inquiry for each of the third and fourth users based on the estimation; means for causing a computer to select a first user who can answer the inquiry from the third and fourth users based on the index; and means for causing a computer to present the first user to the second user.

BRIEF DESCRIPTION OF THE SEVERAL VIEWS OF THE DRAWING

FIG. 1 is a diagram showing a whole constitution example of an information sharing system according to an embodiment of the present invention.

FIG. 5 is a diagram showing one example of a search request input screen.

FIG. 8 is a diagram showing one example of a score table for use in calculating the score corresponding to a degree of communication with a search request person by communication based on a communication history.

FIG. 9 is a diagram showing one example of the score table for use in obtaining the score based on a presumed result of a present situation of the user and a designated search condition.

FIG. 10 is a diagram showing one example of the score table for obtaining the score based on a user's social status and the designated search condition.

FIG. 11 is a diagram showing a display example of a search result.

FIG. 12 is a diagram showing another display example of the search result.

FIG. 13 is a diagram showing one example of the communication history stored in a communication history storage part.

FIG. 14 is an explanatory view of profile data stored in a profile storage part.

DETAILED DESCRIPTION OF THE INVENTION

An embodiment of the present invention will be described hereinafter with reference to the drawings.

FIG. 1 is a diagram showing a whole constitution example of an information sharing system according to the present embodiment. As shown in FIG. 1, the present information sharing system includes one server apparatus 1, and a plurality of (e.g., three in this example) client terminals 2 connected to the server apparatus 1 so that communication is possible. The server apparatus 1 can communicate with the client terminals 2 via a radio communication network, Internet, LAN, and the like. A communication mode and method between the server apparatus 1 and client terminals 2 are not particularly limited.

Figure 2:
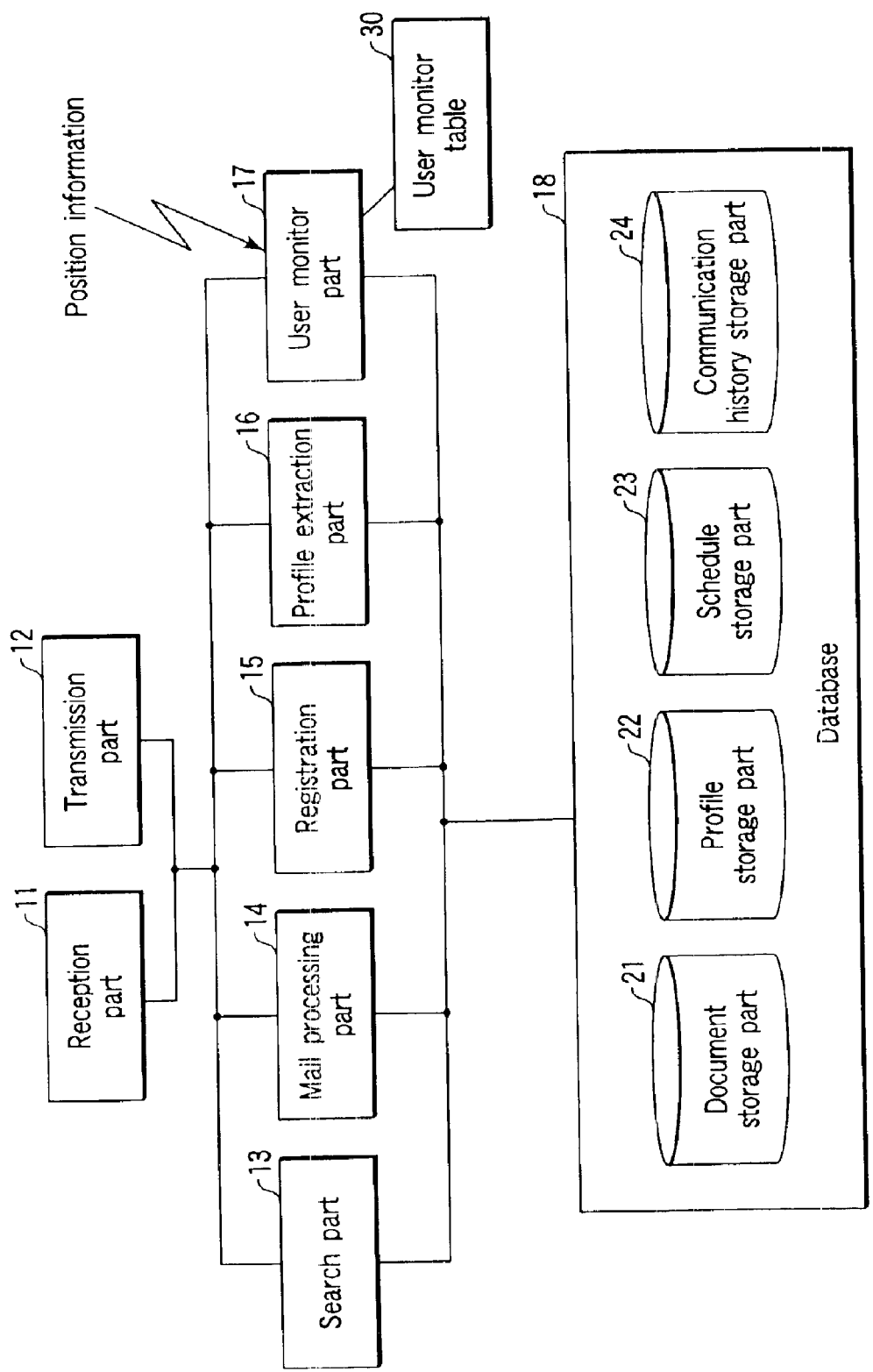
FIG. 2 is a diagram showing a function constitution example of a server apparatus of the information sharing system of FIG. 1.

FIG. 2 is a diagram showing a constitution example of the server apparatus 1. As shown in FIG. 2, the server apparatus 1 includes a reception part 11, transmission part 12, search part 13, mail processing part 14, registration part 15, profile extraction part 16, user monitor part 17, and database 18.

The database 18 includes a document storage part 21, profile storage part 22, schedule storage part 23, and communication history storage part 24.

The document storage part 21 stores a shared document which is prepared by users of the client terminals 2 and which can be browsed/used by all users using the information sharing system (using the client terminals 2). Examples of the shared document include a report prepared in business, minutes of a meeting, and the like. The document is formed in data which is represented by a text, image, and sound.

The profile storage part 22 stores profile information of all the users who use the information sharing system (using the client terminals 2). Examples of the profile information include a user name, post, position, date when the user entered a company, specialized field, and the like, and are stored in a mode shown in FIG. 14.

The schedule storage part 23 stores schedule information of all the users who use the information sharing system (using the client terminals 2). The schedule information is inputted by the respective users who use the information sharing system, and registered in the schedule storage part 23 in a mode, for example, shown in FIG. 15.

The communication history storage part 24 stores communication histories such as main transmission/reception among the users who use the information sharing system (using the client terminals 2) and an access history to the information sharing system. In the present embodiment, the communication history storage part 24 stores the communication history mainly concerning mails in a mode shown in FIG. 13. In the communication history, a transmission date of each mail, transmitter, address, cc (distribution destination of a duplicate of the mail), bcc (distribution destination of the duplicate of the mail without informing a receiver), and the like are also recorded. Additionally, the address of the mail may be a personal address or an address in a mailing list.

The reception part 11 receives various request texts and mails transmitted from the client terminals 2.

The transmission part 12 transmits the search results and mails to the client terminals 2.

The search part 13 processes the search request texts transmitted from the client terminals 2.

The mail processing part 14 processes the mails transmitted from the client terminals 2. The received mail is transmitted to the address user or processed otherwise. In this case, the history is stored in the communication history storage part 24 as shown in FIG. 13.

The registration part 15 registers the shared document and schedule information transmitted from the client terminals 2 in the document storage part 21 and schedule storage part 23 in response to registration requests of the shared documents from the client terminals 2 and registration requests of the schedule information.

The profile extraction part 16 extracts the profile information such as the specialized field of each preparer (user) based on the shared document stored in the document storage part 21. The specialized field of the preparer is presumed from the content of the document, for example, as follows. That is, the profile extraction part 16 extracts terms having a high appearance frequency in each document stored in the document storage part 21, or special terminologies. The profile extraction part 16 compares the extracted terms with terms (terminologies) for frequent use in each field stored beforehand, and specifies a field to which most of the terms belong. The specified field is presumed as the specialized field of the user who prepares the document, and stored in the profile storage part 22.

Additionally, the specialized field in the profile data of each user stored in the profile storage part 22 may be registered by the user. Moreover, the result extracted by the profile extraction part 16 may be registered.

Figures 15, 16:
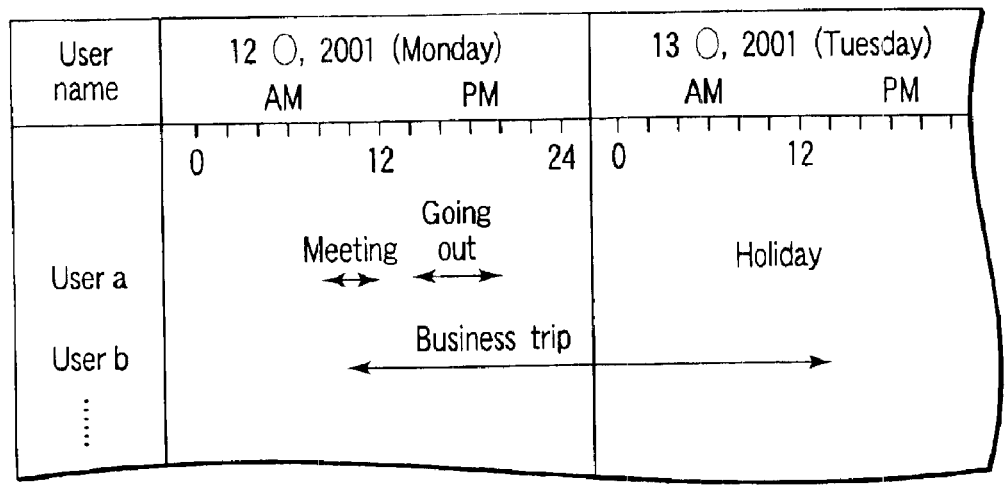
FIG. 15 is an explanatory view of schedule data stored in a schedule storage part.
FIG. 16 is an explanatory view of present situation information of each user registered in a user monitor table.

The user monitor part 17 monitors, for example, operation situations and locations of the client terminals 2 of the respective users. The monitor is executed by notices periodically transmitted from the client terminals 2. For example, it is assumed that the client terminals 2 are always connected to the server apparatus 1. The client terminals 2 periodically inform the server apparatus 1 that the users do not perform any operation using input indication devices such as a keyboard and mouse for a predetermined time after the users turn on the client terminals 2 (e.g., operation situation notice which means "unused"). The user monitor part 17 receives a message of this notice via the reception part 11, and registers the message as information indicating the user's present situation (present situation information) in a user monitor table 30 as shown in FIG. 16. Moreover, when the user uses the input indication devices such as the keyboard and mouse to operate the client terminal 2, the client terminal 2 periodically transmits that (e.g., the operation situation notice meaning "during use") to the server apparatus 1. The user monitor part 17 registers the information obtained by the monitor as the user monitor table 30 in a mode shown in FIG. 16.

Moreover, when the server apparatus 1 does not receive the operation situation notice from any client terminal 2, the apparatus judges that the client terminal 2 is turned off, and registers that (e.g., "turning off") in the user monitor table 30 as shown in FIG. 16. Additionally, when the user uses the client terminal 2 (during logging-in), identification information of the user is usually registered in the user monitor table 30.

Furthermore, each user possesses a personal handy-phone system (PHS) 3 as shown in FIG. 1. This PHS periodically transmits a signal indicating the present position. The signal from the PHS is acquired by a position information acquiring apparatus 4, and appropriately sent as position information to the user monitor part 17. The position information of each user obtained in this manner is registered as the user's present situation information in the user monitor table 30 as shown in FIG. 16. The position information may be registered as such, but it is preferable to specify a place corresponding to the position information (e.g., inside a company, in a business place, and the like) and register the name of the place (location).

On receiving the present situation information such as the operation situation and location of the client terminals 2 of the respective users as described above every time, the user monitor part 17 updates the user monitor table 30. Therefore, each user's latest present situation information is always registered in the user monitor table 30.

Figure 3:
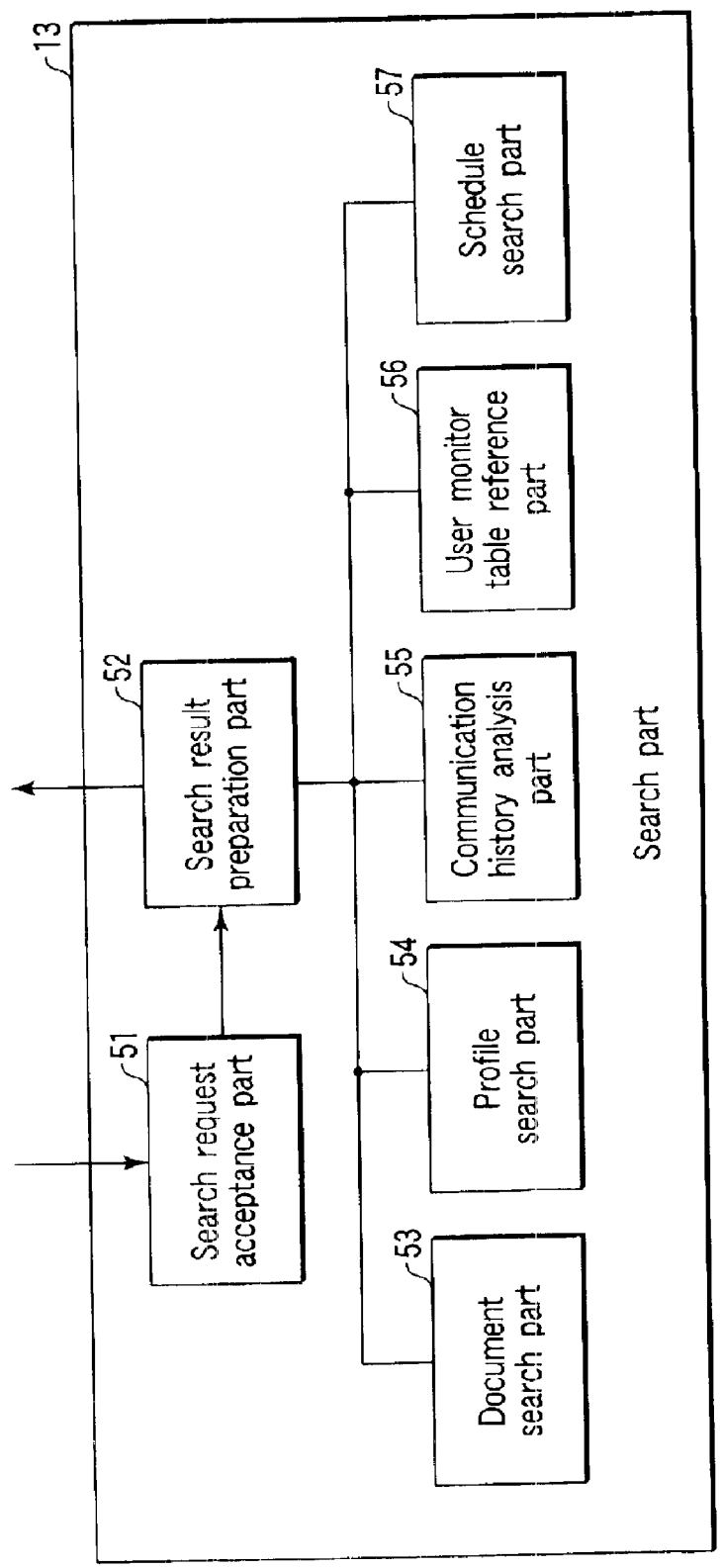
FIG. 3 is a diagram showing a function constitution example of a search part of the server apparatus of FIG. 2.

FIG. 3 is a diagram showing a function constitution example of the search part 13 of FIG. 2. The search part 13 includes a search request acceptance part 51, search result preparation part 52, document search part 53, profile search part 54, communication history analysis part 55, user monitor table reference part 56, and schedule search part 57.

The search request acceptance part 51 accepts a search request received by the reception part 11 from the terminal on the network. The search request acceptance part 51 receives predetermined search equation and search condition together with the search request as described later.

The search result preparation part 52 prepares a search list including a list prepared by the document search part 53 and a list prepared by the profile search part 54.

The document search part 53 searches for a document suitable for an inquiry content (e.g., the search equation described later) from the shared document in the document storage part 21. Moreover, the document search part 53 prepares a preparer list of each document from supplementary information of the searched document.

The profile search part 54 searches for a user who has the profile information suitable for the inquiry content (e.g., the search condition described later) from the profile storage part 22. Moreover, the profile search part 54 prepares a list of searched users.

The communication history analysis part 55 analyzes a communication history stored in the communication history storage part 24, and prepares a mail history data list LOG between a user having made the search requester and a predetermined user.

The user monitor table reference part 56 acquires the present situation information (operation situation, location) of the predetermined user via networks such a LAN and GPS.

The schedule search part 57 searches the schedule storage part 23, and acquires schedule data of a present time of the predetermined user. The present situation information acquired by the user monitor table reference part 56 and the schedule data of the present time obtained by the schedule search part 57 are used for judging quickness for the answer to the inquiry as described later.

A search method realized by the present information sharing system will be described mainly with respect to the operation of the server apparatus 1 with reference to a flowchart shown in FIG. 4.

First, the user who requires the search (hereinafter referred to as a "search requester") inputs a search request Q via the client terminal 2 (step S1). The reception part 11 of the server apparatus 1 receives the search request Q and transmits the request to the search part 13. When the search request acceptance part 51 of the search part 13 receives the search request Q, a search processing is started.

The search request Q is concretely inputted as follows. First, a search request input screen is displayed in a display of the client terminal 2 as shown in FIG. 5. The search requester inputs a text indicating the inquiry content, or one or a plurality of key words relating to the inquiry content in an input region B1 of "search equation" in the screen via a keyboard. Additionally, examples of a method of describing the search equation include a method of describing a logical formula of the keyword, a method of inputting a question text of a natural language, and the like. Any method can be applied in the present embodiment.

Moreover, as shown in FIG. 5, a plurality of selectable search conditions are displayed in a search condition input region B3 of the search request input screen. The search requester selects a desired condition from a plurality of search conditions in the search condition input region B3, and thereby inputs the search condition.

Here, the search condition is a condition of the user who desires the server apparatus 1 to search. Examples of the condition include a quickness condition, social status condition, and the like.

The quickness condition is a condition indicating an urgency concerning the request, such as conditions that a response is quickly obtained, a mail is returned, and a direct access is possible.

In an example in which the information sharing system according to the present embodiment is used in organizations such as a company, the social status condition is a condition concerning social statuses of users such as an executive user, a user in charge of a practice, a user having entered the company in the same period as the search requester user, and a user in the same department as that of the search requester user.

The social status condition can be selected as the search condition for the following reason. That is, for example, there is an inquiry for which everything is solved by asking the executive in the organizations such as the company. Moreover, the user as the search requester easily makes the inquiry to a person in the same position as the user in some case. In this case, it is frequently convenient for the search requester to select a responder from a viewpoint of the social status. However, unless the search method and apparatus of the embodiment are used in a certain organization such as the company, it is unnecessary to particularly include the social status in the search condition.

Additionally, in the present embodiment, the search equation and search condition are inputted in the search request input screen shown in FIG. 5. However, the input mode of the search equation and search condition is not particularly limited. After inputting the search equation and search condition, a search button B2 indicating "search for person" is selected by a mouse. Then, the search request Q including the inputted search equation and search condition is transmitted to the server apparatus 1 from the client terminal 2.

The document search part 53 searches for the shared document whose content meets the search equation included in the search request Q from the shared documents stored in the document storage part 21 (step S2). Since a known technique may be used in searching the document, the description thereof is omitted.

The document search part 53 prepares a list U1 of user names having prepared the respective documents which match the search equations based on a result of document search in the document search part 53 (step S3). In addition to the shared document, the information such as the name of the user having prepared the document can be stored as an index of each shared document in the document storage part 21. Even in this case, the search for the shared document which meets the search equation as the search result can be executed simultaneously with the preparation of the list U1 of the users having prepared the searched shared document.

The profile search part 54 refers to profile data stored in the profile storage part 22 to extract the user having the specialized field which is the same as or similar to the specialized field of each user in the list U1 (e.g., which belongs a category of the same leading concept) (step S1), and prepares a list U2 of the user (step S5). The search result preparation part 52 combines the lists U1 and U2, that is, obtains a logical sum of both lists, and prepares a user list U (step S6).

Subsequently, the search result preparation part 52 refers to the communication history, schedule data, present situation information of each user registered in the user monitor table, profile data, and the like to calculate a score with respect to each user in the user list U in accordance with the search condition included in the search request (step S7).

Figure 6:
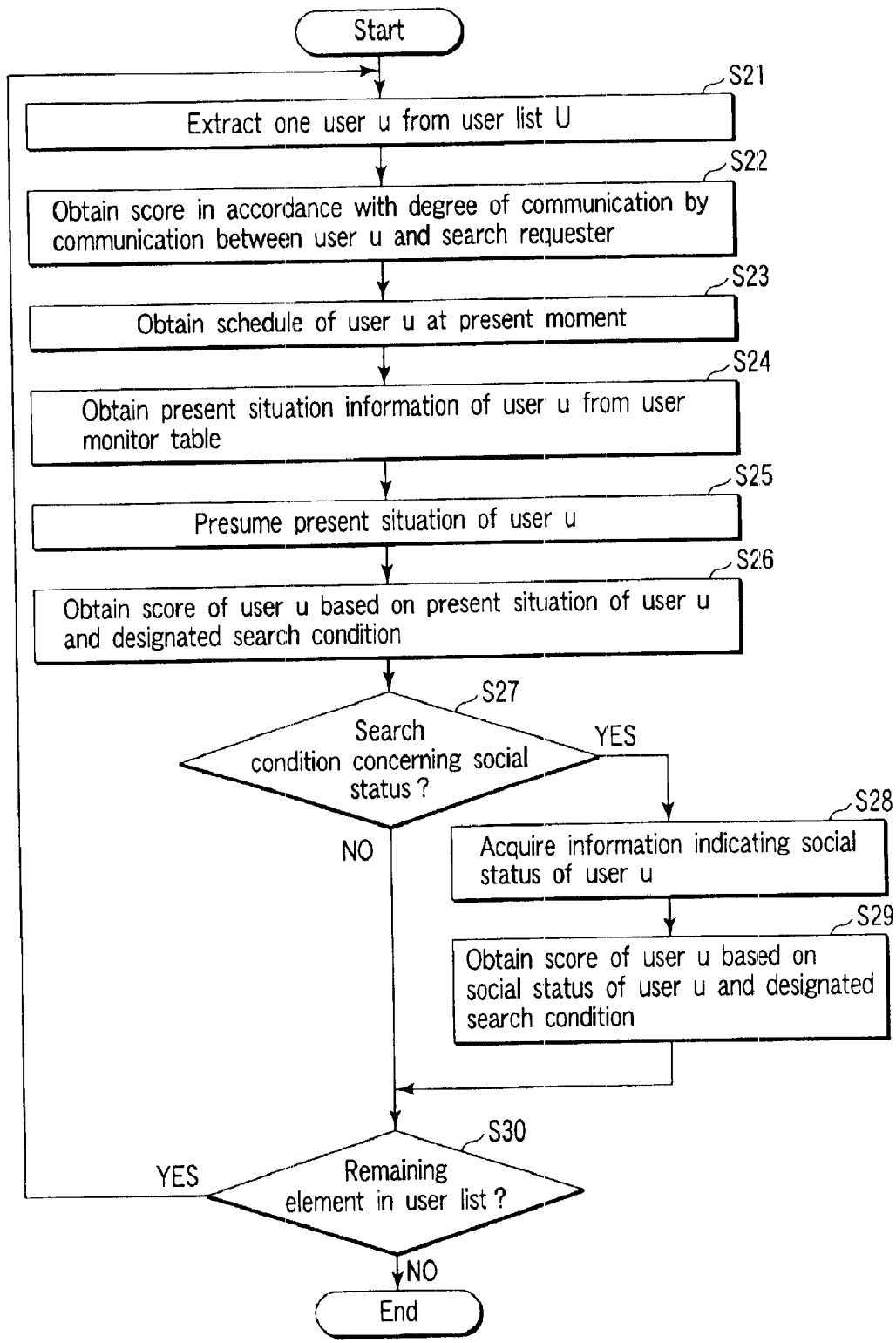
FIG. 6 is a flowchart showing an outline of a procedure of step S7 of FIG. 5 for calculating a score of each user of a user list U.
Figure 7:
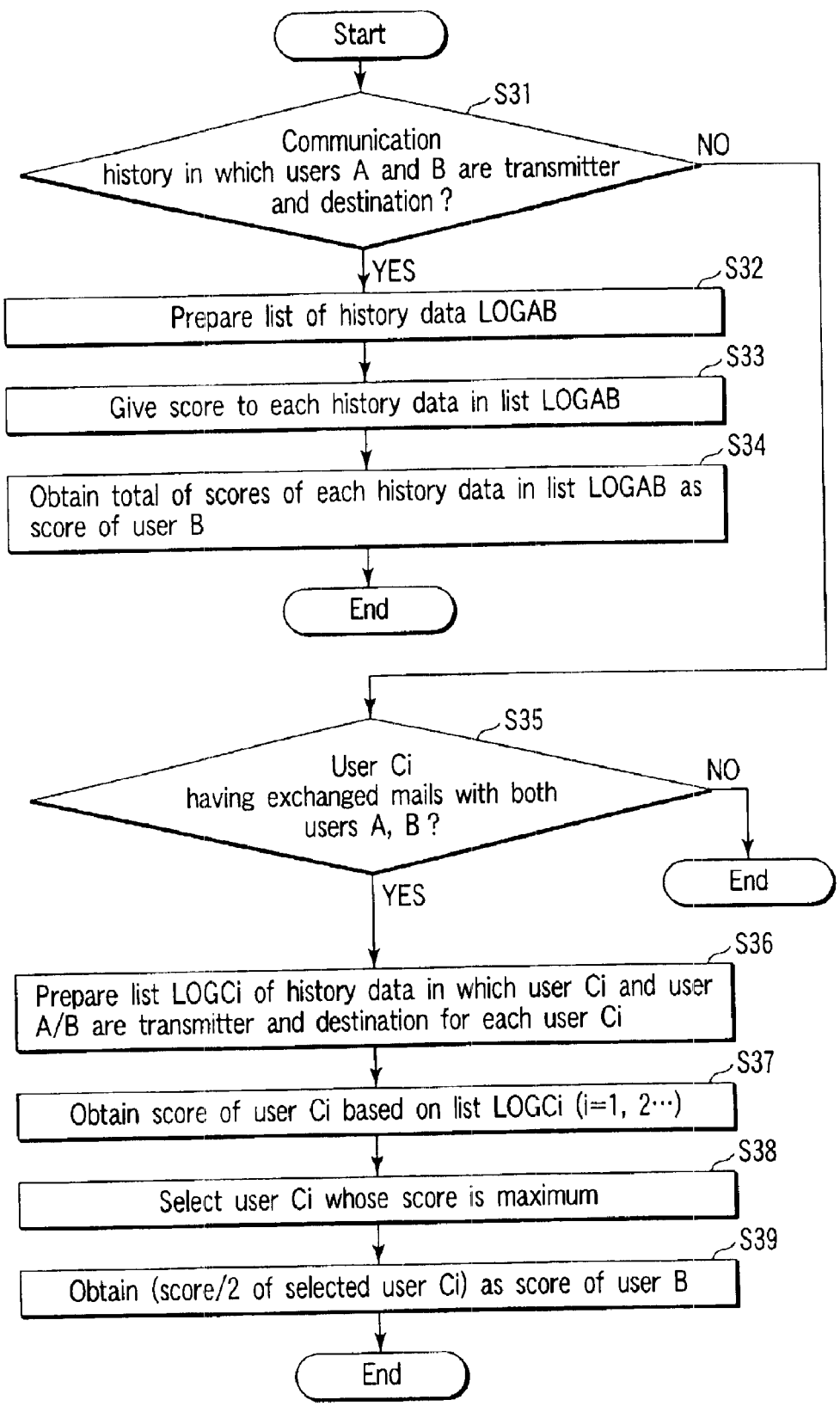
FIG. 7 is a flowchart showing the processing procedure of step S22 of FIG. 6 in more detail.

FIG. 6 is a flowchart showing a processing procedure of the step S7 of FIG. 5 for calculating the score of each user of the user list U. Moreover, FIG. 7 is a flowchart showing the processing procedure of step S22 of FIG. 6 in more detail. A method of calculating the score of each user in the user list U will be described in detail with reference to FIGS. 6, 7.

In FIG. 6, first the search result preparation part 52 extracts each user listed up in the user list U as a user u (step S21). Thereafter, the score of the user u is obtained. The search result preparation part 52 checks communication histories concerning the user u and the user as the search requester one by one, and judges a degree of communication between these two users based on a communication frequency between the user u and the user as the search requester.

Subsequently, the communication history analysis part 55 calculates the score of the user u based on a relationship with the user as the search requester based on the communication history concerning the user u and the user as the search requester stored in the communication history storage part 24 (step S22).

More concretely, in the step S22 of FIG. 6, the following search and numeric value conversion are executed. Additionally, for further concrete description, it is assumed that the user as the search requester is a user A and that the user u extracted from the user list U in the step S21 of FIG. 6 is a user B.

First, as shown in FIG. 7, the communication history analysis part 55 searches the communication history storage part 24, and judges the presence/absence of history data of a mail in which the users A, B are a transmitter, destination (mailing list), and destination of a duplicate (cc, bcc) (step S31). With the presence of the history data of the mail in which the users A, B are the transmitter and destination, the communication history analysis part 55 prepares a list LOGAB of the history data (step S32).

Subsequently, the communication history analysis part 55 uses a predetermined score table, for example, shown in FIG. 8 with respect to each history data in the list LOGAB in accordance with a type of mail (e.g., mailing list, cc, bcc), and gives a score to the user B (step S33). Additionally, the score table of FIG. 8 is stored beforehand. Moreover, in the score table of FIG. 8, a highest score is given to a mail in which the users A, B are designated as destinations.

The communication history analysis part 55 totals the scores of the respective history data in the list LOGAB, and obtains the score of the user B (step S34).

On the other hand, when there is not the communication history by the mail directly transmitted/received between the users A, B in the step S31, the processing advances to step S35.

It is judged in the step S35 whether or not there is another user Ci (i=1, 2, . . . ) having exchanged mails with both the users A and B (step S35). When the presence of another user Ci is judged, the communication history analysis part 55 prepares a list LOGCi of the history data of mails including the user Ci and user A or B as the transmitter and destination for each user Ci (step S36).

The communication history analysis part 55 obtains the score of the user Ci for each list LOGCi similarly as the steps S33, S34 (step S37). Moreover, the user Ci whose score is maximum is selected (step S38), and the score of the user B is set to ½ of the score of the user Ci (step S39).

On the other hand, it is judged that another user Ci does not exist in the step S35. In this case, the communication history analysis part 55 ends the processing.

According to the procedure shown in FIG. 7, the score increases with the user A, that is, a user having many mail exchanges with the user as the search requester, and a user having many mail exchanges in which both addresses are designated in the destination. Considering from at least the mail exchange, the user having a high score can be judged to have a high degree of communication with the user as the search requester, that is, to have friendly relations with the search requester. The user having friendly relations with the user as the search requester is a user from whom a response to the inquiry of the user as the search requester can easily be obtained.

Additionally, for the sake of convenience of the processing, a lowest score, for example, "1" in this example is given to the user B not having exchanged any mail with the user A and not having exchanged any mail with a user who has exchanged the mail with the user A.

Turning back to the description with reference to FIG. 6. The schedule search part 57 searches the schedule storage part 23, and acquires the schedule data of the user u at the present moment (step S23). The user monitor table reference part 56 acquires the present situation information (operation situation, location) of the user u registered in the user monitor table 30 (step S24).

The search result preparation part 52 presumes the present situation of the user u from the schedule and present situation information of the user u (step S25). The present situation is presumed, for example, as follows. First, for example, the search result preparation part 52 judges that the client terminal 2 is being used (the client terminal 2 is turned on and operated), not used (the client terminal 2 is turned on but unused), or turned off (the client terminal 2 is turned off) as the present situation information of the user u.

Subsequently, the search result preparation part 52 refers to the schedule data of the user u. According to the schedule data, the user u is not scheduled to go out or have a business trip, the location is in the company, and the present situation information (operation situation) of the client terminal 2 is "being used". In this case, the search result preparation part 52 judges that the user u is seated. Moreover, according to the schedule data, the user u is not scheduled to go out or have the business trip, and the location is in the company, but the operation situation is "unused". Then, the search result preparation part 52 judges that the user temporarily leaves the seat (e.g., for a meeting). Furthermore, according to the schedule data, the user u is scheduled to go out or have the business trip, the operation situation is "turned off", and the location is not in the company. Then, the search result preparation part 52 judges that the user u is absent (going out/on the business trip). Furthermore, it can be checked from the schedule data whether or not the user u is on holiday (at home).

Subsequently, the search result preparation part 52 obtains the score of the user u based on the presumed result of the present situation of the user u and the designated search condition (step S26). For example, the predetermined and stored score table shown in FIG. 9 is used in calculating the score of the user u.

In the score table of FIG. 9, weight values are set with respect to the respective search conditions included in the search request Q (e.g., "immediate response desired", "mail response desired", "direct access desired") in accordance with the presumed present situation (e.g., "seated", "out/on the business trip", "temporarily off the seat"). For example, when "immediate response desired" is designated as the search condition (see FIG. 5), the seated user has a high score. The weighting is performed in this manner. In the example of FIG. 9, the present score is set to be multiplied by "2".

When "mail response desired" is designated as the search condition, the response can usually be made from anywhere. Therefore, the same weighting is performed in all situations. For example, here, the present score is set to be multiplied by "1" regardless of the present situation of the user u. When "direct access desired" is designated as the search condition, the weighting is performed so as to give a high score to the seated user. For example, here, the present score is set to be multiplied by "1.5".

Subsequently, it is judged whether or not the search condition concerning the social status is included in the search conditions (step S27). When the search condition concerning the social status is not included in the search conditions, the processing advances to step S30, and a processing of steps S21 to S26 is performed with respect to other users.

On the other hand, when the search condition concerning the social status is included in the search conditions, the profile search part 54 searches the profile data of each user of the user list U stored in the profile storage part 22 and the profile data of the user as the search requester. Subsequently, the information indicating the social status included in the searched profile data (e.g., "post", "position", "hire date") is acquired with respect to each user (step S28). The score is obtained with respect to each user of the user list U based on the information concerning the social status and the designated search condition (step S29).

For example, a predetermined score table shown in FIG. 10 is referred to in obtaining the score based on the social status of the user u (e.g., department manager, part manager, no responsible post in the company in this example) and the social status designated as the search condition with respect to the user u in the user list U of the step S29.

In the score table of FIG. 10, the weight values are set with respect to the respective search conditions included in the search request Q (e.g., "preference to executives", "the same department", "person in charge of the practice") in accordance with the user's post (department manager, part manager, no responsible post). For example, when "preference to executives" is designated as the search condition, the weighting is performed so as to give a higher score to the department manager. In the example of FIG. 19, the present score is set to be multiplied by "2".

When "the same department" is designated as the search condition, usually the presence/absence of the post is not related, and therefore the same weighting is performed in all the posts. In the example of FIG. 10, the present score is set to be multiplied by "1" regardless of the post of the user u. When "person in charge of the practice" is designated as the search condition, the weighting is performed so as to give a higher score to the part manager. For example, here, the present score is set to be multiplied by "2".

As described above, with respect to the respective users u listed up in the user list U, the scores can be calculated based on the degree of communication via communication with the user as the search requester up to now, the present situation of the user u (the location and operation situation of the client terminal), and the social status of the user u (when designated in the search condition).

The processing of the steps S21 to S29 is executed with respect to all the users of the user list U (step S30).

The score of each user of the user list U obtained as described above indicates a suitability to the search condition including the present situation of the user and the degree of communication with the user as the search requester via the communication (further including the social status, when the search condition concerning the social status is designated).

Figure 4:
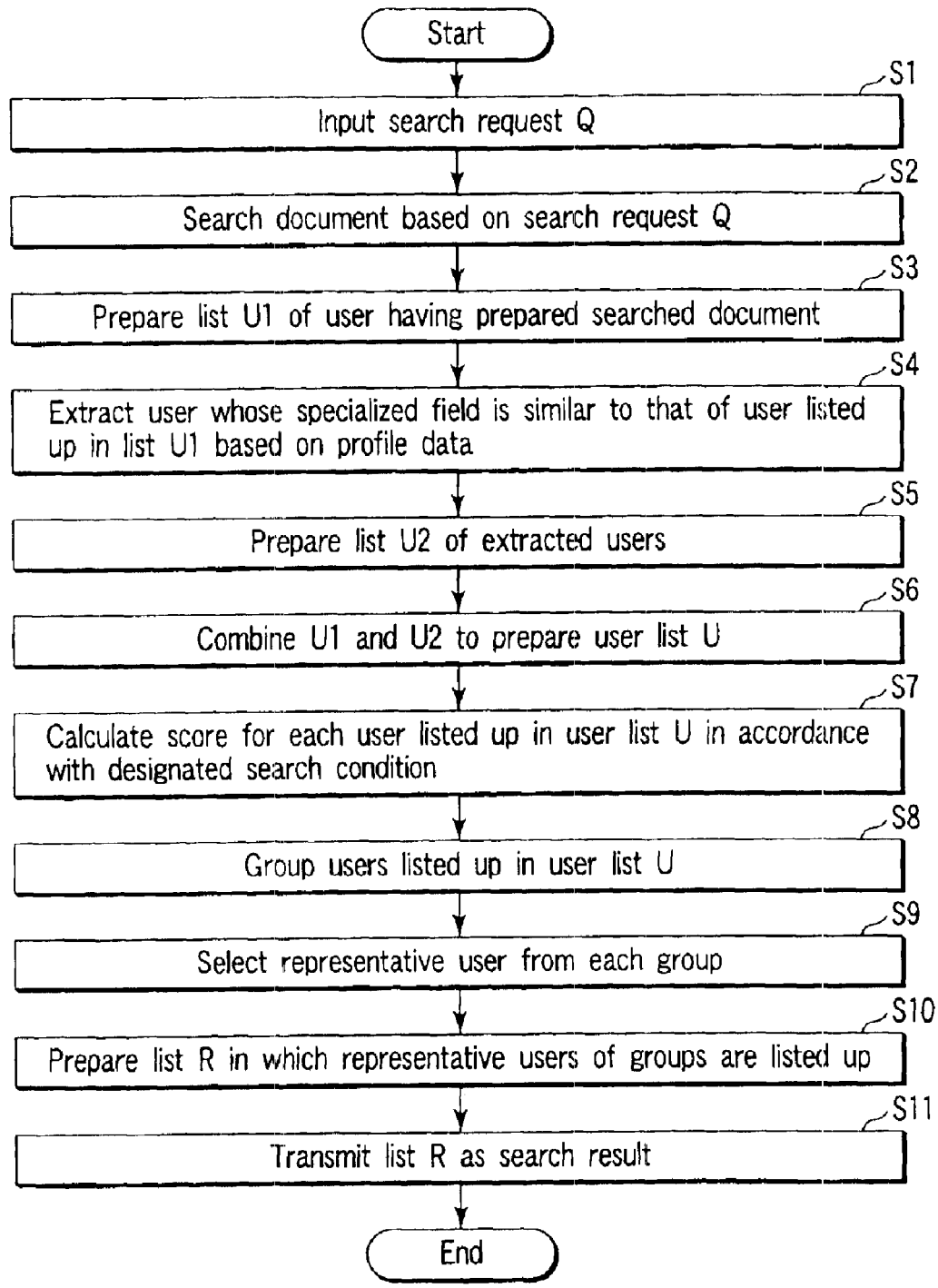
FIG. 4 is a flowchart showing a processing operation of the search part of FIG. 3.

Turning back to the description with reference to FIG. 4. After calculating the scores with respect to the respective users listed up in the user list U, the search result preparation part 52 classifies the respective users listed up in the user list U into a plurality of groups (grouping) (step S8).

For the classification, a standard on which the grouping is to be performed is not particularly limited. For example, in the company, the users in the same department may be grouped in one group, and the users registered in the same mailing list may be grouped in one group. Moreover, when there is the shared document prepared by a plurality of users in cooperation, the plurality of users may be in one group. During this grouping, the grouping may be performed using only one standard. Furthermore, a plurality of standards may be used to perform the grouping for each standard. In this case, one user belongs to a plurality of groups.

Subsequently, a representative user is selected from each group based on the score of each user belonging to the group (step S9), and a list of representative users of the respective groups, that is, a list R is prepared (step S10). For example, the representative user is a user who has a highest score in the group. This list R is transmitted as a search result to the client terminal 2 of the search requester via the transmission part 12 (step S11).

Additionally, a purpose of the grouping lines in that the search result is presented to the user in an easily understandable manner and that a desired user is easily selected from the group. Therefore, if necessary, a selection processing of the representative user in the step S9 may be omitted. In this case, it is preferable to arrange the respective users of the user list U in order from the obtained highest score and to transmit several users in a high ranking as the search result.

FIG. 11 shows a display example of the search result. In the example of FIG. 11, three groups are prepared as the search result. Moreover, in addition to the name of the representative user of each group, a picture of a user's face, position, and information of the group are also displayed.

FIG. 12 shows another display example of the search result. In this example, an icon 1001 indicating the presumed present situation of the representative user of each group (e.g., "seated", "on the business trip", and the like) is displayed. Moreover, the user obtained as the search result is a user who has not exchanged the mail with the user as the search requester. Therefore, an access intermediary is introduced to the user (in this example, for example, the name of the user Ci extracted in the processing of and after the step S35 of FIG. 7 is displayed as the intermediary). In this case, it is considered that the user as the search requester is not easily accessible.

As described above, according to the present embodiment, the user can be selected based on the expertise of the respective users of a plurality of terminal apparatuses connected to the network, the degree of communication of the user as the search requester presumed based on the history of the communication performed via the network, and the present situations of the respective users. As a result, it is possible to search for a user who can securely answer the inquiry.

Additionally, in the present embodiment, after selecting the users qualified for the inquiry response first in accordance with the expertise, the user preferable for the inquiry response is selected based on the degree of communication and the present states of the respective users. The selection order of the user by each standard can arbitrarily be changed. For example, first the users having a high degree of communication are selected based on the history of the communication performed via the network. The users may further be selected from the selected users based on the standards of the expertise and present situation in the constitution. Similarly, the constitution may comprise: selecting the users who can quickly respond based on the present situations of the respective users; and selecting the users from the selected users further based on the standards of the degree of communication and present situation.

Moreover, in the present embodiment, when the user's present situation is presumed, three conditions, that is, the user's schedule data, present location, and operation situation of the client terminal are used. The embodiment is not limited to this. When at least two of the conditions are used, the similar effect can be expected. For example, the schedule data and present location, the schedule data and the operation situation of the client terminal, the present location and the operation situation of the client terminal, and the like may appropriately be used in accordance with the specifications and constitution of the system.

Moreover, it is possible to designate a search condition concerning the social status that the user entered the company in the same year as the user as the search requester as the search condition. In this case, the information for performing the weighting so that the user having the same hire date as the user as the search requester has a high score may be added to the score table, for example, shown in FIG. 10.

Furthermore, in the present embodiment, the degree of communication between the users is calculated mainly by the condition history of mails. However, the present embodiment is not limited to this. For example, the constitution may comprise: calculating the degree of communication between the users by the communication history of a predetermined community held in the network via a cellular phone or Internet, and message board. The constitution is particularly useful in introducing the present search method in the network system used by an undefined number of users, not in a closed environment such as the company.

Additionally, in the above-described embodiment, with respect to the respective users listed up in the user list U, the degree of communication with the user as the search requester is obtained from the communication history. Additionally, an action pattern in the communication of each user, which can be presumed by the analysis of the communication history, may be reflected in the score of the user. Examples of the user's action pattern in performing the communication include patterns in which the user surely answers the mail upon reception, a probability of making the response is not less than a predetermined value, and a probability of making the response to the received mail is not more than the predetermined value. This action pattern can easily be judged based on the communication history and mail content shown in FIG. 13. It can be judged that the response to the inquiry from the user as the search requester can easily be obtained from the user having a high probability of making the response to the received mail. Therefore, the weighting may be performed so that the score of the user is high.

Moreover, in the above-described embodiment, the personal relation in the network is extracted using the communication history by the mail. Additionally, it is also considered that the personal relation is extracted using data such as extension of a link into a personal web page, insertion in a bookmark, and followup to an article in network news.

Furthermore, in the above-described embodiment, the information sharing system also serves as an electronic mail system, and the information sharing system manages the communication history. The embodiment is not limited to this case. For example, the constitution may comprise: disposing a separate computer functioning as a mail server; and connecting the computer to the information sharing system via a predetermined network. The information sharing system may have the similar function, when the communication history stored in the computer is read out (searched) according to need.

Additionally, the profile storage part 22 and schedule storage part 23 may similarly include the constitution in which computers including these parts are separately disposed and connected to the information sharing system according to need. The information sharing system can have the similar function, when the profile data and schedule data are read out (searched) according to need.

The method of the embodiment of the present invention may be stored and distributed as a program which can be executed by the computer via recording media such as a magnetic disk (floppy disk, hard disk, and the like), optical disk (CD-ROM, DVD, and the like), and semiconductor memory.

Additionally, the present invention is not limited to the above-described embodiment, and can variously be modified without departing from the scope in an implementation stage. Furthermore, the above-described embodiment includes various stages of the present invention, and various invention can be extracted by an appropriate combination of a plurality of disclosed constituting elements. For example, even when some constituting elements are deleted from all constituting elements described in the embodiment, but when (at least one of) the problems described in paragraphs of the problem to be solved by the invention can be solved, and (at least one of) the effects described in paragraphs of the effect of the invention can be obtained, the constitution with the constituting elements deleted therefrom can be extracted as the invention.

What is claimed is:

1. A search apparatus which searches for a first user capable of answering an inquiry from a second user from users of a plurality of terminal apparatuses connected to a network, the apparatus comprising:
   a receiving unit configured to receive the inquiry and a search condition;
   a memory which stores shared documents prepared by the users of the plurality of terminal apparatuses respectively and profile information of the users;
   a search unit configured to search a shared document related to the inquiry and one of the profile information which matches the search condition from the memory and to extract a third user who have prepared the searched shared document and a fourth user corresponding to the searched profile information from the users of the plurality of terminal apparatuses;
   a calculator which calculates a degree of communication between the third and fourth users and the user who has made the inquiry based on a history of communication using the network;
   a selection unit configured to select a user who can answer the inquiry as the first user from the third and fourth users based on the degree of communication with the second user; and
   a presentation unit configured to present the first user to second the user.

2. The search apparatus according to claim 1, wherein the search condition includes a specialized field concerning the inquiry.

3. The search apparatus according to claim 1, wherein the search condition includes information concerning social statuses of the users of the plurality of terminal apparatuses,
   the calculator calculates a suitability of the extracted users to the inquiry based on the information concerning the social statuses of the users of the plurality of terminal apparatuses, and
   the selection unit configured to select the first user based on the degree of communication and the suitability.

4. The search apparatus according to claim 1, wherein the selection unit divides the third and fourth users into a plurality of groups based on an arbitrary category, and selects a representative from each of the groups as the first user based on the degree of communication with the second user.

5. A search apparatus which searches for a first user capable of answering an inquiry from a second user from users of a plurality of terminal apparatuses connected to a network, the apparatus comprising:
   a receiving unit configured to receive the inquiry and a search condition;
   a memory in which shared documents prepared by the users of the plurality of terminal apparatuses respectively and profile information of the respective users are stored;
   a search unit configured to search a shared document related to the inquiry and one of the profile information which matches the search condition from the memory and to extract a third user who has prepared the searched shared document and a fourth user corresponding to the searched profile information;
   an estimation unit configured to estimate present situations of the third and fourth users;
   a calculator which calculates an index indicating a quickness for the answer to the inquiry for each of the third and fourth users based on the estimation;
   a selection unit configured to select a user who can answer the inquiry as the first use from the third and fourth users based on the index; and
   a presentation unit configured to present the first user to the second user.

6. The search apparatus according to claim 5, wherein the search condition includes a specialized field concerning the inquiry.

7. The search apparatus according to claim 5, wherein the search condition includes information concerning social statuses of the users,
   the calculator calculates a suitability of the third and fourth users to the inquiry based on the information concerning the social statuses of the users of the plurality of terminal apparatuses, and
   the selection unit selects the first user based on the index and the suitability.

8. The search apparatus according to claim 5, wherein the estimation unit estimates the present situations of the third and fourth users based on at least two of schedule information of the third and fourth users, present locations, and operation situations of the corresponding terminals.

9. The search apparatus according to claim 5, wherein the selection unit divides the third and fourth users into a plurality of groups based on an arbitrary category, and selects a representative from each of the groups as the first user based on quickness of each of the third and fourth users.

10. A search method of searching for a first user who can answer an inquiry from a second user from users of a plurality of terminal apparatuses connected to a network, the method comprising:
    receiving the inquiry and a search condition;
    searching shared documents, which are prepared by the users of the plurality of terminal apparatuses respectively and concern the inquiry, and profile information of the users for the shared documents related to the inquiry and the profile information which matches the search condition;
    extracting a third user who has prepared a searched shared document and a fourth user corresponding to the searched profile information;
    calculating a degree of communication between the third and fourth users and the second user based on a history of communication using the network;
    selecting a user who can answer the inquiry from the respective extracted users as the first user based on the degree of communication with the second user; and
    presenting the first user to the second user.

11. The search method according to claim 10, wherein the search condition includes a specialized field concerning the inquiry.

12. The search method according to claim 10, wherein the search condition includes information concerning social statuses of the users of the plurality of terminal apparatuses;
    the calculation includes calculating a suitability of the third and fourth users to the inquiry based on the information concerning the social statuses of the third and fourth users; and
    the selection includes selecting the first user based on the degree of communication and the suitability.

13. The search method according to claim 10, wherein the selection includes dividing the third and fourth users into a plurality of groups based on an arbitrary category; and selecting a representative from each of the group as the first user based on the degree of communication with the second user.

14. A search method of searching for a first user who can answer an inquiry from a second user from users of a plurality of terminal apparatuses connected to a network, the method comprising:

receiving the inquiry and a search condition;

searching shared documents, which are prepared by the users of the plurality of terminal apparatuses respectively and concern the inquiry, and profile information of the users for the shared document related to the inquiry and the profile information which matches the search condition;

extracting a third user who has prepared the searched shared document and a fourth user corresponding to the searched profile information;

estimating present situations of the third and fourth users;

calculating an index indicating a quickness for the answer to the inquiry for each of the third and fourth users based on the estimation;

selecting a user who can answer the inquiry from the extracted users as the first user based on the index; and presenting the first user to the second user who has made the inquiry.

15. The search method according to claim 14, wherein the search condition includes a specialized field.

16. The search method according to claim 14, wherein the search condition includes information concerning social statuses of the users of the plurality of terminal apparatuses;

the calculation includes calculating a suitability of the third and fourth users to the inquiry based on the information concerning the social statuses of the third and fourth users; and the selection includes selecting the first user based on the index and suitability.

17. The search method according to claim 14, wherein the presuming includes: presuming the present situations of the third and fourth users based on at least two of schedule information of the third and fourth users, present locations, and operation situations of the corresponding terminals.

18. The search method according to claim 14, wherein the selection includes dividing the third and fourth users into a plurality of groups based on an arbitrary category; and selecting a representative from each of the groups as the first user based on the index of each of the third and fourth users.

19. A search method of using a network to search for a first user who can answer an inquiry from a second user, the method comprising:

receiving the inquiry and search condition;

calculating a degree of communication between the second and a plurality of users of a plurality of terminal apparatuses connected to the network based on a history of communication using the network;

selecting a user who can answer the inquiry from a plurality of users of the plurality of terminal apparatuses as the first user based on expertise of each of the users and the degree of communication; and presenting the first user to the second user.

20. A computer-readable memory storing a search program utilizing a plurality of terminal apparatuses connected to a network, the program comprising:

means for causing a computer to receive an inquiry from a second user and a search condition;

means for causing a computer to store shared documents prepared by the users of the plurality of terminal apparatuses respectively and profile information of each of the users;

means for causing a computer to search the shared documents related to the inquiry and the profile information which matches the search condition and to extract a third user who has prepared the searched shared document and a fourth user corresponding to the searched profile information;

means for causing a computer to calculate a degree of communication between the third and fourth users and the second user based on a history of communication using the network;

means for causing a computer to select a first user who can answer the inquiry from the third and fourth users based on the degree of communication with the second user; and means for causing a computer to present the first user to the second user.

21. The computer-readable memory according to claim 20, wherein the search condition includes a specialized field.

22. The computer-readable memory according to claim 20, wherein the search condition includes information concerning social statuses of each of the users of the plurality of terminal apparatuses, the calculation means calculates a suitability of the third and fourth users to the inquiry based on the information concerning the social statuses of each of the third and fourth users, and the selection means selects the first user based on the degree of communication and the suitability.

23. The computer-readable memory according to claim 20, wherein the selection means divides the third and fourth users into a plurality of groups based on an arbitrary category, and selects a representative from each of the groups as the first user based on the degree of communication with the second user.

24. A computer-readable memory storing a search program utilizing a plurality of terminal apparatuses connected to a network, the program comprising:

means for causing a computer to receive an inquiry from a second user and a search condition;

means for causing a computer to search a shared document related to the inquiry and profile information of each of the users which matches the search condition and to extract a third user who has prepared the searched shared document and a fourth user corresponding to the searched profile information;

means for causing a computer to estimate present situations of the third and fourth respective users;

means for causing a computer to calculate an index indicating a quickness for the answer to the inquiry for each of the third and fourth users based on the estimation;

means for causing a computer to select a first user who can answer the inquiry from the third and fourth users based on the index; and means for causing a computer to present the first user to the second user.

25. The computer-readable memory according to claim 24, wherein the search condition includes a specialized field.

26. The computer-readable memory according to claim 24, wherein the search condition includes information concerning social statuses of each of the users of the plurality of terminal apparatuses, the calculation means calculates a suitability of the third and fourth users to the inquiry based on the information concerning the social statuses of each of the users of the plurality of terminal apparatuses, and the selection means selects the first user based on the index and suitability.

27. The computer-readable memory according to claim 24, wherein the estimation means estimates the present situations of the third and fourth users based on at least two of schedule information of the third and fourth users, present locations, and operation situations of the corresponding terminals.

28. The computer-readable memory according to claim 24, wherein the selection means divides the third and fourth users into a plurality of groups based on an arbitrary category, and selects a representative from each of the groups as the first user based on the index of each of the third and fourth user.

* * * * *